(12) United States Patent
McDaniel

(10) Patent No.: US 6,478,419 B1
(45) Date of Patent: Nov. 12, 2002

(54) COMBINATION EYEGLASS BUOYANCY SYSTEM

(76) Inventor: V. Robin McDaniel, P.O. Box 9711, Panama City Beach, FL (US) 32417

( * ) Notice: Subject to any disclaimer, the term of this patent is extended or adjusted under 35 U.S.C. 154(b) by 0 days.

(21) Appl. No.: 10/104,291

(22) Filed: Mar. 25, 2002

Related U.S. Application Data

(60) Provisional application No. 60/279,636, filed on Mar. 30, 2001.

(51) Int. Cl.$^7$ .................................................. G02C 1/00
(52) U.S. Cl. ......................................... 351/43; 351/157
(58) Field of Search ........................... 351/43, 41, 156, 351/157, 158; 2/426, 427, 428, 452

(56) References Cited

U.S. PATENT DOCUMENTS

| | | | |
|---|---|---|---|
| 4,696,556 A | * 9/1987 | Perry, III | ..................... 351/157 |
| 5,015,085 A | * 5/1991 | May | ............................. 351/43 |
| 5,019,000 A | 5/1991 | Stephens | |
| 5,905,560 A | 5/1999 | Daniel | |

* cited by examiner

*Primary Examiner*—Hung Xuan Dang
(74) *Attorney, Agent, or Firm*—William B. Noll

(57) ABSTRACT

The combination of a pair of eyeglasses featuring a pair of temple arms, and a highly buoyant, hollow tubing of 100% natural latex extending between the temple arms. The hollow tubing, preferably about seventeen inches in length, with an outside diameter of about ¼ inch and a wall thickness of about 3/64 inch, is formed by a hot dipping process to produce multiple layers. When secured to the temple arms, the hollow tubing forms an airtight chamber therebetween to provide buoyancy to the combination to help prevent loss thereof when loose or free in water.

6 Claims, 1 Drawing Sheet

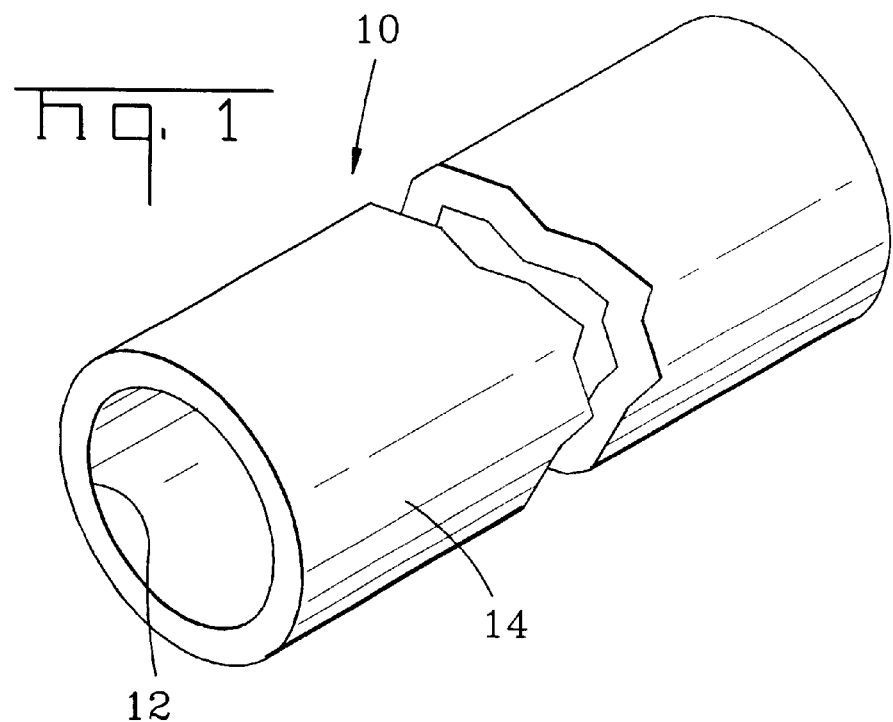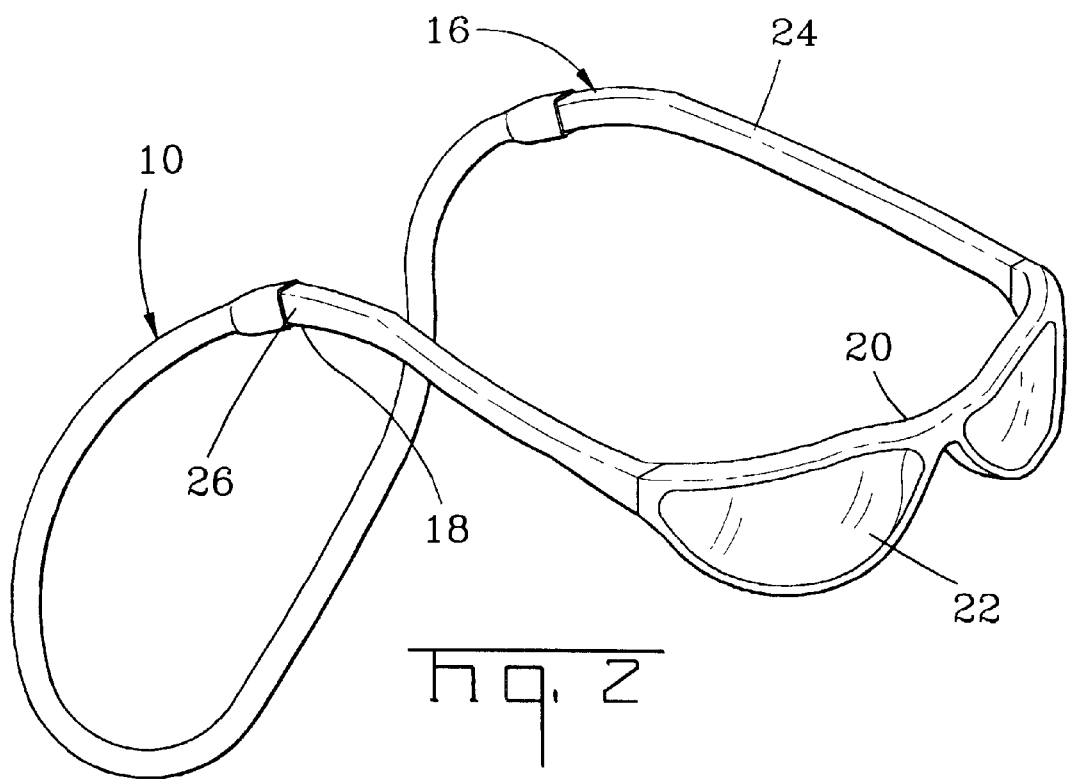

COMBINATION EYEGLASS BUOYANCY SYSTEM

RELATED APPLICATION

This application claims priority of Provisional Application, Ser. No. 60/279,636, filed Mar. 30, 2001, by the inventor hereof, where the contents thereof are incorporated herein by reference.

FIELD OF THE INVENTION

This invention is directed to the field of buoyant objects, more particularly to the combination of an eyeglass having a highly buoyant flexible tubing, more particularly a hollow tubing of highly elastic, 100% natural latex joined to the respective ends.

BACKGROUND OF THE INVENTION

The present invention relates to a buoyant flexible tubing, such as formed of 100% natural latex, having an exterior brominated surface that is user friendly, that may be secured to light weight items to ensure against the loss of such items in a body of water, i.e. pool or off shore. It was discovered that a discrete length of said tubing, when intimately anchored at its respective ends to selected items, includes an airtight central chamber that aids in the ability of the tubing to provide buoyancy to the item. Such discovery gives the user thereof a convenient means to take such articles as sunglasses, hotel keys, etc. into a body of water without fear of losing same. Should the article fall off of one's neck, for example, it will float to permit easy retrieval by the user.

The prior art, as reflected in the following three U.S. Patents, illustrate different applications for such flexible tubing, but none recognize the buoyancy nature of the tubing when securely fixed to selected articles:

a. U.S. Pat. No. 5,639,000, to the inventor hereof, teaches a watch band assembly that includes a pair of buckle devices and a strap assembly. The buckle devices are fabricated to be a one piece structure which are adapted to be removably secured to opposite ends of a conventional watch. Extending outwardly from the buckle devices are studs that are adapted to receive and maintain the strap assembly. The strap assembly is comprised of at least one elongated tubular member having opposite ends. These ends are adapted to be releasably secured to the buckle devices.
  b. U.S. Pat. No. 5,905,560, to Daniel, relates to a personal eyeglass and head gear retainer system to protect the user thereof from the loss of such items. The system comprises, in combination, a conventional style head gear, preferably in the form of a baseball cap or a sun visor, where the head gear features a discontinuous peripheral rim, and conventional style eyeglasses, such as sunglasses. Included in the combination is a pair of flexible cords of a discrete length and joined together at an intermediate position along the lengths. A first end of each cord is secured to the peripheral rim of the head gear, and a second end is secured to a respective free end of the eyeglass ear supports.
  c. U.S. Pat. No. 5,019,000, to Stephens, is directed to an eyeglass retainer for holding afloat said eyeglasses. The retainer is an elongated, water impervious, resilient hollow tube having open ends which grip the bows of an eyeglass frame and float in the form of an open celled plastic block having a pair of parallel through openings. The flexible tube is threaded through the openings prior to attachment of the ends of the tube to the eyeglass bows. The block has a buoyancy greater than the weight of the eyeglasses to thereby hold the eyeglasses close to the surface of a body of water.

While the prior art recognizes certain capabilities and uses for latex tubing members, none teach or suggest the unique capability of such tubing to provide a high degree of buoyancy to selected items when exposed to a body of water, namely pools and off shore at lakes and oceans. The manner by which selected items can take advantage of this unusual attribute will become more apparent in the further descriptions and drawings.

SUMMARY OF THE INVENTION

This invention teaches a highly buoyant tubing element that has particular utility in providing buoyancy to selected light weight items, such as eyeglasses, to prevent the loss of such items in a body of water, i.e. pool or off shore. The preferred tubing element comprises a continuous hot dip coated, 100% natural latex, where the tubing element is formed by plural hot dipping of a mandrel, where a preferred number of times is about ten to thirteen to build up a sufficient layer of latex on the mandrel. Thereafter, the multi-layered tubing is subjected to a bromine chemical treatment that yields a smooth, user friendly exterior surface, a surface that does not irritate the skin or become tangled in one's hair. After removal of the mandrel, a flexible tubing element results. The resultant tubing exhibits a high degree of elasticity, about 800%, and an excellent memory, i.e. ability to return to its preflexed shape after flexing. A preferred tubing element is a discrete length of about seventeen inches, an O.D. of ¼", an I.D. of 5/32", with a wall thickness of 3/64". The hollow nature of the tubing element traps air within the tubing, when the ends of the discrete length are secured to the eyeglasses, for example, in an air tight mode. The nature of this treated natural latex provides an excellent means of giving buoyancy to a light-weight item, up to about 2 ounces, that otherwise would not float in water.

Accordingly, a feature of this invention is the provision of a highly buoyant system, such as for light-weight eyeglasses, that features a flexible tubing of 100% natural latex, having a brominated treated exterior surface, and an elasticity of about 800%.

Another feature hereof lies in the use of a hot dip processed natural latex material, which after processing includes a chemical brominating treatment.

Still another feature of the invention includes a 100% natural latex tubing formed of multiple layers, where the outer layers are colored by the inclusion of a color dispersion in the hot dip coating bath.

These and other features of the invention will more become apparent from the following description, especially when read in conjunction with the accompanying drawings.

BRIEF DESCRIPTION OF DRAWINGS

FIG. 1 is an enlarged perspective view of a discrete length of latex tubing according to the invention that exhibits the feature of buoyancy and elasticity when intimately secured to selected items.

FIG. 2 is a perspective view of an exemplary use for the highly buoyant tubing of this invention.

DETAILED DESCRIPTION OF PREFERRED EMBODIMENT

This invention is directed to a buoyant flexible tubing element that has the unique capability to provide buoyancy to selected items to which the tubing is secured. The tubing element will now be described with regard to the accompanying Figures, where like reference numerals represent like components or features in the two views.

Turning first to FIG. 1, an enlarged perspective view of a preferred tubing element 10 of this invention is illustrated. The tubing element 10 comprises a thin walled, 100% natural latex material, having an elasticity of about 800%, and excellent memory capabilities, where a preferred embodiment has an O.D. of ¼", an I.D. of 5/32" and a wall thickness of 3/64". The tubing may be manufactured by a hot dipping process. Specifically, a continuous mandrel is repeatably passed through a bath of latex, maintained at a temperature of about 115 to 120°, or through plural baths, for from ten to thirteen times to add new layers. A preferred practice is to use an initial bath of natural white latex, followed by a second colored bath containing a color dispersion to develop a brightly colored exterior. The multi-layered tubing, with its ends closed if freed from the mandrel, is subjected to a chemical bromine treatment, as later discussed, to develop a smooth exterior surface that is user friendly. That is, the smoothness prevents any irritation with the user's skin, and will not get tangled in the user's hair. In contrast to the exterior surface, the interior wall 12 of the tubing is characterized by a tightly gripping surface that is useful in receiving and holding an item, such as the ear support of a pair of eyeglasses. As a consequence, whether the multi-layered tubing has been brominated or not, to remove the solidified tubing from about the mandrel, air pressure may be applied to one end which helps free the tubing to allow removal of the mandrel.

As noted above, the exterior 14, in contrast, is rendered much smoother by dipping or applying the tubing into a bromide bath. This treatment helps to eliminate sticking and other skin discomfort that may be caused by untreated tubing.

A unique property of the thus treated tubing element is its high elasticity, i.e. an ability to stretch, which in this case is about 800%. This property is critical to ensure the ability of the tubing element 10 to be fitted onto an item, such as the ear support or temple arm of eyeglasses 16, see FIG. 2, and readily conform to the shape of the end. Tightly conforming to and securing the end 18 is critical to ensure an air tight seal thereabout.

However, due to the tightly gripping interior wall 12, assistance in the form of a drop of soapy water, such as a 1% solution, is applied to the end 18 of the tubing element to facilitate entry of the larger selected item into the tubing element. By securing the respective ends, as described above, to a discrete length of the tubing element, where a preferred length is about seventeen (17) inches, an air tight chamber results. As is known with typical eyeglasses, as seen in FIG. 2, eyeglasses comprises a frame 20 with a pair or continuous lens 22, and a pair of temple arms 24, usually hinged to the frame 20, where the temple arm terminates in a turned flattened distel tip 26. The cross section of the distel tip 26 is greater than the cross section of the hollow tubing. Due to the highly elastic nature of the 100% natural latex, and the roughened interior surface of the tubing, a strong grip, much like the Chinese finger cuff system, is achieved. Further, the combination of the air chamber and nature of the thin walled, 100% natural latex tubing results in a highly buoyant component that may be used to give floating properties to selected items, such as eyeglasses (FIG. 2).

It is recognized that changes, variations and modifications may be made to the buoyancy system of the invention, particularly by those skilled in the art, without departing from the spirit and scope thereof. Accordingly, no limitations are intended to be imposed thereon except as set forth in the accompanying claims.

What is claimed is:

1. The combination of a set of eyeglasses featuring a frame mounting at least one eye protecting lens, and a pair of temple arms extending from said frame, where each said arm includes a free end adapted to lie in proximity to a human ear when the eyeglasses are worn; and, a highly buoyant, multi-layered, flexible, hollow tubing of a discrete length and formed of 100% natural latex by a process of hot dipping, which after said hot dipping is subjected to a chemical bromine treatment to render the exterior surface smooth and non-binding to the wearer's hair, said hollow tubing having an elasticity of about 800%, an outside diameter of about ¼ inch and a wall thickness of about 3/64 inch, and an interior surface of a roughened, tightly gripping texture, said hollow tubing secured at its respective ends to a respective free end of said temple arms.

2. The combination according to claim 1, wherein said hollow tubing includes a colored exterior surface formed by the outer layers in the hot dipping process containing a color dispersion.

3. The combination according to claim 1, wherein said discrete length for said hollow tubing is seventeen inches.

4. The combination according to claim 3, wherein said hollow tubing comprises thirteen layers, and at least several outermost said layers are colored.

5. The combination according to claim 4, wherein the innermost layers are white and the five outermost layers are colored.

6. The combination according to claim 1, where the cross section of the free ends of said temple arms is greater than the cross section of said hollow tubing, whereby insertion of said free ends into said hollow tubing will result in an airtight chamber to provide the necessary buoyancy.

* * * * *